United States Patent [19]

Higashi et al.

[11] Patent Number: 4,640,394
[45] Date of Patent: Feb. 3, 1987

[54] LOCK-UP CONTROL SYSTEM FOR AN AUTOMATIC TRANSMISSION

[75] Inventors: Haruki Higashi; Seiji Yashiki, both of Hiroshima; Kouichirou Waki, Mihara; Toshiyuki Kikuchi, Higashihiroshima, all of Japan

[73] Assignee: Mazda Motor Corporation, Hiroshima, Japan

[21] Appl. No.: 730,036

[22] Filed: May 3, 1985

[30] Foreign Application Priority Data

May 14, 1984 [JP] Japan ................... 59-96175

[51] Int. Cl.$^4$ ................ F16H 45/02; B60K 41/28
[52] U.S. Cl. ................. 192/3.29; 192/0.092; 192/3.31; 192/3.58
[58] Field of Search .............. 192/0.033, 0.052, 0.076, 192/0.092, 3.29, 3.3, 3.31, 3.58

[56] References Cited

U.S. PATENT DOCUMENTS

| | | | |
|---|---|---|---|
| 4,270,636 | 6/1981 | Sunohara et al. | 192/3.31 |
| 4,298,105 | 11/1981 | Duhaime | 192/3.31 X |
| 4,373,619 | 2/1983 | Schritt et al. | 192/0.052 X |
| 4,386,687 | 6/1983 | Chevalier et al. | 192/3.3 |
| 4,431,095 | 2/1984 | Suga | 192/3.31 |
| 4,448,293 | 5/1984 | Maeda | 192/3.3 |
| 4,457,410 | 7/1984 | Suga et al. | 192/0.052 |
| 4,463,842 | 8/1984 | Redzinski | 192/0.052 |
| 4,531,433 | 7/1985 | Suga | 192/3.31 X |
| 4,582,182 | 4/1986 | Takeda et al. | 192/3.31 |

Primary Examiner—Rodney H. Bonck
Assistant Examiner—Richard M. Lorence
Attorney, Agent, or Firm—Gerald J. Ferguson, Jr.; Michael P. Hoffman; Ronni S. Malamud

[57] ABSTRACT

A lock-up control system for an automatic transmission including a torque converter coupled with an engine, a power transmitting gear arrangement controlled by a gear ratio control device in accordance with a shifting up or down signal, and a lock-up clutch provided for locking up the output shaft of the torque converter to the output shaft of the engine. The lock-up control system comprises lock-up operation control apparatus causing the lock-up clutch to be in its inoperative state when the gear ratio control device performs the control with the shifting up or down signal, and lock-up command device for preventing the lock-up operation control apparatus from causing the lock-up clutch to be in its inoperative state until a predetermined reductive variation in the speed of the output shaft of the torque converter arises after the shifting up signal is supplied to the gear ratio control device under the condition in which the lock-up clutch is in operation.

7 Claims, 12 Drawing Figures

LOCK-UP CONTROL SYSTEM FOR AN AUTOMATIC TRANSMISSION

BACKGROUND OF THE INVENTION

1. Field of the Invention

The present invention relates generally to control systems for automatic transmissions employed in vehicles, and more particularly, to a lock-up control system for an automatic transmission having a lock-up clutch which is provided between the input and output shafts of a fluid torque converter driven by an engine and operative to couple the output shaft of the fluid torque converter with the output shaft of the engine on the selected occasion in accordance with, for example, engine load and vehicle speed.

2. Description of the Prior Art

There has been commonly used in vehicles an automatic transmission comprising a fluid torque converter and a multi-stage power transmitting gear arrangement including a planetary gear mechanism. In such an automatic transmission equipped with the fluid torque converter and employed in a vehicle, a transmitting gear ratio shifting control, such as shifting up or down control, is usually carried out through an oil hydraulic control circuit provided therein. More specifically, for achieving a required shift of transmitting gear ratio, paths of the oil hydraulic control circuit are switched over therebetween by mechanical or electromagnetic valves to cause friction elements, such as brakes and clutches associated with the multi-stage power transmitting gear arrangement, to operate properly so as to switch over power transmitting paths from one to another in the multi-stage power transmitting gear arrangement. In the case where the paths of the oil hydraulic control circuit are switched over therebetween by the electromagnetic valves to effect the shift of transmitting gear ratio, it is detected that the travelling state of the vehicle has exceeded a predetermined gear ratio range by a certain electronic detector and the electromagnetic valves are caused to operate selectively by the output of the detector.

In the automatic transmission equipped with the fluid torque converter as described above, since a power is transmitted through a fluid in the fluid torque converter, the vehicle having such an automatic transmission employed therein can travel smoothly but, on the contrary, may be accompanied by loss of energy caused due to the slipping of the fluid and resulting in increased fuel consumption.

Accordingly, there has been proposed an automatic transmission having a lock-up clutch which is provided in a fluid torque converter and operative to couple the output shaft of the fluid torque converter directly with the output shaft of an engine, when each of the vehicle speed and engine load becomes a predetermined value or more. In such an automatic transmission equipped with the fluid torque converter having the lock-up clutch in the above manner, however, a lock-up control is required in addition to the aforementioned transmitting gear ratio shifting control, that is, shifting up or down control. In the lock-up control, it has been proposed to release temporarily a lock-up state held by the lock-up clutch during the transmitting gear ratio shifting operation, even if the lock-up clutch is situated to be to operate, for the purpose of avoiding the shock of great degree which may arise from the shift of transmitting gear ratio carried out under the lock-up state held by the lock-up clutch left in operation.

However, when the lock-up state is released in accelerating the vehicle with an accelerator pedal stepped on with a driver's foot, the speed of the engine is rapidly increased due to the slip of the fluid in the fluid torque converter. This is out of a problem in the shifting down control because the speed of the engine is required to be increased by the amount corresponding to the increased gear ratio. In the shifting up control by which the speed of the engine is to be lowered, if the timing of releasing the lock-up state is too early, there is raised such a problem that the speed of the engine is first increased transitorily too much so as to induce a so-called spout up of the engine, then lowered, and this results in unpleasantness to a driver.

For avoiding such a problem, for example, as disclosed in U.S. Pat. No. 4,431,095, issued to M. Suga, on Feb. 14, 1984, there has been proposed a method of control in which a lock-up releasing signal for causing a lock-up clutch to be in its inoperative state is delayed by a predetermined constant period of time in relation to a shifting up signal, which is supplied to cause the multi-stage power transmitting gear arrangement to effect the shifting up operation therein, to be supplied to a corresponding oil hydraulic actuator provided in an oil hydraulic control circuit for controlling the lock-up clutch and the multi-stage power transmitting gear arrangement.

Generally, in oil hydraulic control circuits for a vehicle, the pressure (line pressure) of an oil to be fed into oil hydraulic actuators is controlled to be heightened when a throttle valve of an engine is made open, and to be lowered when the throttle valve is closed. The reason for this is that, since the output torque of the engine is increased with the throttle valve opened, it is required to increase the line pressure acting on the oil hydraulic actuators for causing clutches and brakes to operate so as to bring about increment in power transmitting capacity of the clutches and in braking force of the brakes. Since the operating period of time of each oil hydraulic actuator in the automatic transmission is shortened when the line pressure is thus increased, the period of time of each control for shifting the transmitting gear ratio is also generally shortened. On the other hand, because the pressure in the fluid torque converter is kept substantially constant by a reqlutator or check valve independently of the line pressure from the viewpoint of a transmitting efficiency, the period of time required for releasing the lock-up state held by the lock-up clutch can not vary depending on the level of the line pressure.

Consequently, in the case where the delay time of the lock-up releasing signal is kept constant on the ocassion of the shifting up operation in the multi-stage power transmitting gear arrangement, as described above, the problems that the shock of great degree is caused by the shift of transmitting gear ratio with a certain opening degree of the throttle valve and further that the spurt up of the engine is induced by the shift of transmitting gear ratio with another opening degree of the throttle valve, may arise.

OBJECTS AND SUMMARY OF THE INVENTION

Accordingly, it is an object of the present invention to provide a lock-up control system for an automatic transmission which avoids the problems encountered with the prior art.

Another object of the present invention is to provide a lock-up control system for an automatic transmission, wherein a lock-up state held by a lock-up clutch is so released that the shock can be moderated and the spurt up of an engine can be prevented on the occasion of the shifting up or down operation in a power transmitting gear arrangement.

A further object of the present invention is to provide a lock-up control system for an automatic transmission, wherein on the occasion of the shifting up operation in a power transmitting gear arrangement, the variation in the speed of the output shaft of a torque converter is detected and a lock-up state held by a lock-up clutch provided in the torque converter is released when a predetermined reductive variation in the speed of the output shaft of the torque converter arises.

A still further object of the present invention is to provide a lock-up control system for an automatic transmission, wherein on the occasion of the shifting up operation in a power transmitting gear arrangement, a lock-up releasing signal is supplied to a lock-up control device for controlling the operation of a lock-up clutch provided in a torque converter at an appropriate timing at which the speed of the output shaft of the torque converter is being enough lowered.

According to an aspect of the present invention, there is provided a lock-up control system for an automatic transmission including a torque converter coupled with the output shaft of an engine, a power transmitting gear arrangement coupled with the output shaft of the torque converter and controlled to vary the transmitting gear ratio therein by a gear ratio control device in accordance with a shifting up or down signal supplied to the latter, and a lock-up clutch provided for locking up the output shaft of the torque converter to the output shaft of the engine on the selected occasion; which comprises lock-up operation control means for controlling the lock-up clutch to be in its operative state and in its inoperative state selectively, and in particular, for causing the lock-up clutch to be in its inoperative state when the gear ratio control device performs the control with the shifting up or down signal, and lock-up command means for preventing the lock-up control means from causing the lock-up clutch to be in its inoperative state until a predetermined reductive variation in the speed of the output shaft of the torque converter arises after the shifting up signal is supplied to the gear ratio control device under the condition in which the lock-up clutch is in operation to hold a lock-up state.

With the lock-up control system for an automatic transmission thus constituted in accordance with the present invention, the lock-up clutch is brought into its operative state to lock up the output shaft of the torque converter to be substantially coupled directly to the output shaft of the engine in a predetermined condition, and on the occasion of the shifting up or down operation carried out in accordance with the shifting up or down signal in the power transmitting gear arrangement, the lock-up state held by the lock-up clutch is temporarily released. The timing of temporarily releasing the lock-up state held by the lock-up clutch after the supply of the shifting up signal to the gear ratio control device is set in response to the predetermined reductive variation appearing in the speed of the output shaft of the torque converter. Thus, when the shifting up operation is carried out, the lock-up state held by the lock-up clutch is released at an appropriate timing at which the speed of the output shaft of the torque converter is being enough lowered, so that the shock attended with the shifting up operation can be effectively suppressed and the spurt up of the engine can be surely prevented from occuring. Consequently, in a vehicle equipped with the lock-up control system for an automatic transmission according to the present invention, it is possible to avoid the situation of giving an unpleasant driving feel in the transmitting gear ratio shifting operation and the fuel consumption can be reduced.

The above, and other objects, features and advantages of the present invention will be apparent from the following detailed description which is to be read in conjunction with the accompanying drawings.

DESCRIPTION OF THE PREFERRED EMBODIMENTS

Figure 1:
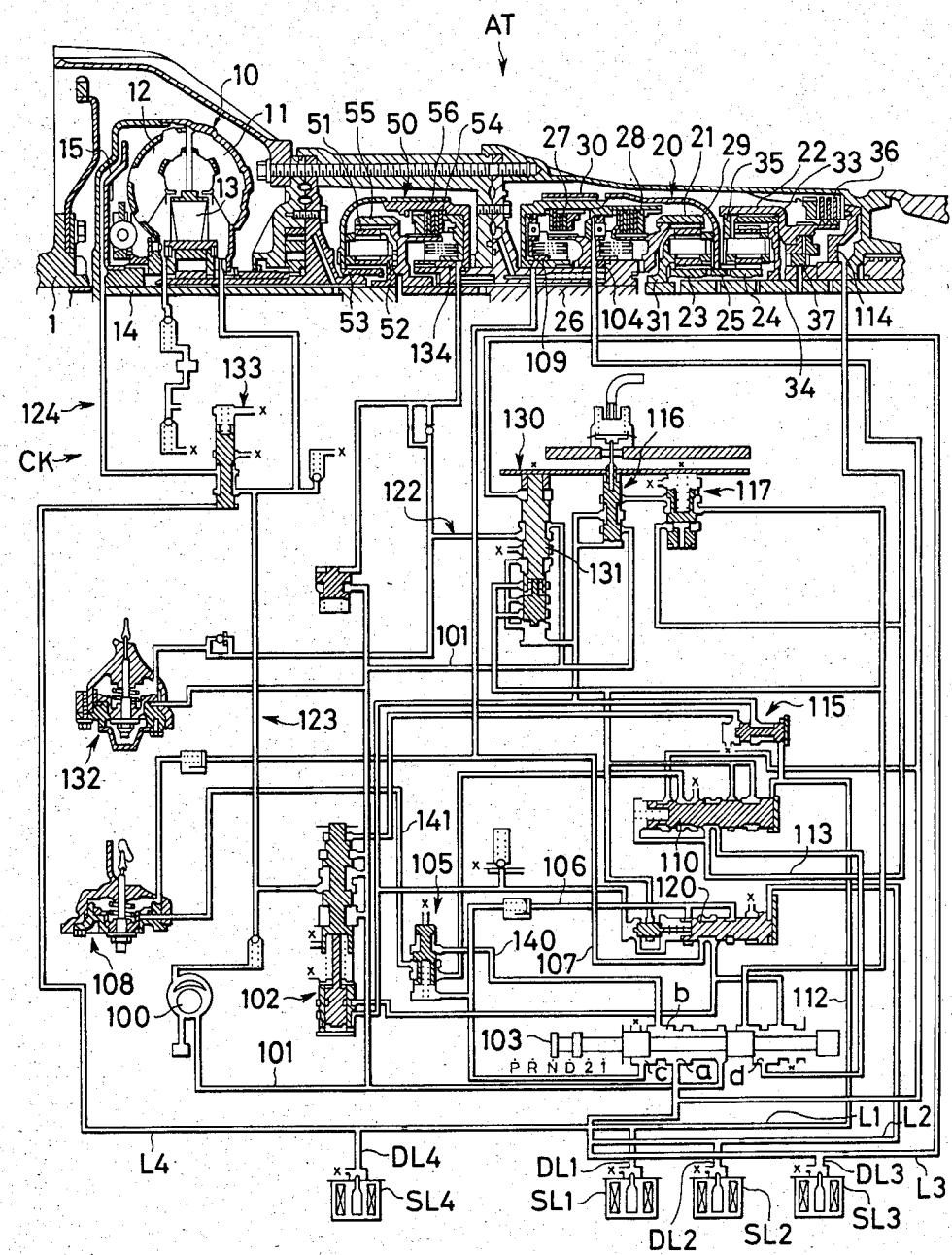
FIG. 1 is a sectional view showing mechanical details and an oil hydraulic control circuit of an automatic transmission to which one embodiment of lock-up control system for an automatic transmission according to the present invention is applied.

Referring to the drawings and particularly to FIG. 1, there are shown, in section, mechanical parts and an oil hydraulic control circuit of an automatic transmission to which an example of a lock-up control system for an automatic transmission according to the present invention is applied.

In FIG. 1, an automatic transmission AT comprises a torque converter 10, a multi-stage power transmitting gear arrangement 20, and an overdrive transmitting planetary gear arrangement 50 disposed between the torque converter 10 and the arrangement 20.

The torque converter 10 includes a pump impeller 11 adapted to be rotatably driven through the coupling with an output shaft 1 of an engine, a turbine runner 12 disposed to be opposite to the pump impeller 11, and a stator 13 interposed between the pump impeller 11 and the turbine runner 12. An output shaft 14 of the torque converter 10 is coupled with the turbine runner 12. A lock-up clutch 15 is disposed between the output shaft 14 of the torque converter 10 and the pump impeller 11. The lock-up clutch 15 is constantly biased in the engaging direction, that is, in the direction for locking up or directly coupling the output shaft 14 of the torque converter 10 to the output shaft 1 of the engine under the influence of the hydraulic pressure of an operating oil circulating within the torque converter 10, and adapted to be urged in the direction reverse to the engaging or locking up direction into its disengaging state by a disengaging hydraulic pressure supplied from the outside.

The multi-stage power transmitting gear arrangement 20 includes a first or front planetary gear unit 21 and a second or rear planetary gear unit 22, and a sun gear 23 of the first planetary gear unit 21 is connected with a sun gear 24 of the second planetary gear unit 22 through a connecting shaft 25. The arrangement 20 has an input shaft 26 which is connected to the connecting shaft 25 through a first or front clutch 27 and to an internal gear 29 through a second or rear clutch 28. Between the connecting shaft 25 and a transmission casing, that is, sun gears 23 and 24 and the transmission casing, a first or front brake 30 is provided. The first planetary gear unit 21 has a planetary carrier 31 connected to an output shaft 34, and the second planetary gear unit 22 has an internal gear 33 which is also connected to the output shaft 34. A second or rear brake 36 and a one way clutch 37 are interposed between a planetary carrier 35 of the second planetary gear unit 22 and the transmission casing.

The overdrive transmitting planetary gear arrangement 50 includes a planetary gear 51 which is rotatably carried on a planetary carrier 52 adapted to be connected to the output shaft 14 of the torque converter 10, and a sun gear 53 adapted to be connected to an internal gear 55 through a direct-coupling clutch 54. An overdrive brake 56 is disposed between the sun gear 53 and the transmission casing. The internal gear 55 is coupled with the input shaft 26 of the arrangement 20.

The arrangement 20 has three forward gear ratio stages and one backward gear ratio stage in the conventional manner, so that a required gear ratio can be provided through proper operations of the clutches 27 and 28 and the brakes 30 and 36. The overdrive transmitting planetary gear arrangement 50 couples the output shaft 14 of the torque converter 10 directly with the input shaft 26 of the arrangement 20 when the direct-coupling clutch 54 is engaged and the overdrive brake 56 is disengaged, and couples the output shaft 14 of the torque converter 10 with the input shaft 26 of the arrangement 20 to be in an overdrive state when the direct-coupling clutch 54 is disengaged and the overdrive brake 56 is engaged.

The automatic transmission AT, which includes the mechanical parts arranged in the manner as described above, also has an oil hydraulic control circuit CK associated therewith. The oil hydraulic control circuit CK includes an oil pump 100 adapted to be driven by the output shaft 1 of the engine. An operation oil discharged from the oil pump 100 into a pressure line 101 is adjusted in pressure by a pressure regulator valve 102 and passed into a selector valve 103. The selector valve 103 has the 1st, 2nd, D, R and P shaft positions, and when the selector valve 103 is in the 1st, 2nd or P shaft position, the pressure line 101 is permitted to communicate with a port a, b or c of the selector valve 103. The port a is connected to an actuator 104 for actuating the second clutch 28. When the selector valve 103 is in the 1st, 2nd or P shift position, the second clutch 28 is held in engagement. The port a is also connected to the left end of a 1-2 shift valve 110 to push the spool thereof to the right in the drawing. The port a is further connected to the right ends of 1-2, 2-3 and 3-4 shift valves 110, 120 and 130 through first, second and third lines $L_1$, $L_2$ and $L_3$, respectively. First, second and third drain lines $DL_1$, $DL_2$ and $DL_3$ are diverged from the first, second and third lines $L_1$, $L_2$ and $L_3$, respectively, and have first, second and third solenoid valves $SL_1$, $SL_2$ and $SL_3$ respectively connected thereto for opening or closing the drain lines $DL_1$, $DL_2$ and $DL_3$, respectively. When each solenoid valve $SL_1$, $SL_2$ or $SL_3$ is energized with the port a being in communication with the pressure line 101, each drain line $DL_1$, $DL_2$ or $DL_3$ is opened so that the pressure is consequently reduced within each of the lines $L_1$, $L_2$ and $L_3$.

The port b is also connected to a lock valve 105 by way of a line 140, and the pressure therein serves to urge the spool of the lock valve 105 downwards in the drawing. When the lock valve 105 is in its lower position, the line 140 is permitted to communicate with a line 141, so that the hydraulic pressure is introduced into the pressure chamber of a actuator 108 for engaging the first brake 30, thereby to actuate the first brake 30. The port c is connected to the lock valve 105, and the pressure therein acts to urge the spool of the lock valve 105 upward. The port c is further connected to the 2-3 shift valve 120 by way of a pressure line 106. The line 106 is allowed to communicate with a line 107 when the second solenoid valve $SL_2$ in the second drain line $DL_2$ is deenergized so that the pressure in the second line $L_2$ is increased to cause the spool of the 2-3 shift valve 120 to move under the influence of this increased pressure. When the line 107 which is connected to the pressure chamber of the actuator 108, provided for disengaging the first brake 30, introduces the hydraulic pressure into the same, the actuator 108 actuates the first brake 30 to be operative to disengage against the pressure in the pressure chamber for engaging the first brake 30. In addition, the pressure in the line 107 is also conducted to an actuator 109 for the first clutch 27 to engage the latter.

The selector valve 103 has a port d which communicates with the line 101 at the 1st position thereof, and the port d leads through a line 112 to the 1-2 shift valve 110 and is connected through a line 113 to an actuator 114 for the second brake 36. When each of the first and second solenoid valves $Sl_1$ and $SL_2$ is deenergized by a predetermined signal, the 1-2 or 2-3 shift valve 110 or 120 has the spool moved to switch over the line, whereby the corresponding brake or clutch is operated to effect the shift of 1-2 or 2-3 gear ratio. The oil hydraulic control circuit CK also includes a cut-back valve 115 for stabilizing the hydraulic pressure from the pressure regulator valve 102, a vacuum throttle valve 116 for varying the line pressure from the pressure regulator valve 102 depending upon the magnitude of a negative intake pressure, and a throttle back-up valve 117 adapted to assist the vacuum throttle valve 116.

In addition, in the oil hydraulic control circuit CK, there are the 3-4 shift valve 130 and an actuator 132 for the purpose of controlling the direct-coupling clutch 54 and overdrive brake 56 of the overdrive transmitting planetary gear arrangement 50. The engaging pressure chamber of the actuator 132 is connected to the pressure line 101, and the pressure in the latter causes the overdrive brake 56 to be urged in the direction of engagement. When the third solenoid valve $SL_3$ is deenergized, a spool 131 of the 3-4 shift valve 130 is moved down, in the same manner as the aforesaid 1-2 and 2-3 shift valves 110 and 120, to disconnect a line 122 from the pressure line 101, and the hydraulic pressure in the line 122 is discharged. Thereupon, no hydraulic pressure acts on the pressure chamber of the actuator 132, provided for disengaging the overdrive brake 56, and the latter is thereby actuated in the direction of engagement, while at the same time, an actuator 134 for the direct-coupling clutch 54 operates to disengage the direct-coupling clutch 54.

The oil hydraulic control circuit CK further includes a lock-up control valve 133 which is in communication with the port a of the selector valve 103 through a fourth line L4. From the fourth line L4, a fourth drain line DL4, which has a fourth solenoid valve SL4 provided therein, diverges from the fourth line L4, in the same manner as the drain lines DL1, DL2 and DL3. With such an arrangement of the lock-up control valve 133, when the fourth solenoid valve SL4 is energized or turned on to close the fourth drain line DL4 thereby to cause the pressure to be increased within the fourth line L4, the spool of the lock-up control valve 133 disconnects a line 123 from a line 124, whereby the oil pressure in the line 124 is discharged to cause the lock-up clutch 15 to be moved for coupling the output shaft 14 of the torque converter 10 directly to the output shaft 1 of the engine.

In the following Tables, there are given the relationships of the respective stages of gear ratio and the lock-up stage with the respective solenoid valves, and those in operation of the respective stages of gear ratio with the clutches and the brakes, in the above configuration:

TABLE 1

| Solenoid shifting position | First | Second | Third |
|---|---|---|---|
| 1 | ON | ON | ON |
| 2 | OFF | ON | ON |
| 3 | OFF | OFF | ON |
| 4 | OFF | OFF | OFF |

TABLE 2

| Fourth solenoid | Lock-up |
|---|---|
| ON | Operative |
| OFF | Released |

Table 3

| Shift position | Clutch 28 | Clutch 27 | Clutch 15 | Clutch 54 | Brake 36 | Brake 30 | Brake 56 | Clutch 37 | Gear ratio |
|---|---|---|---|---|---|---|---|---|---|
| P | | | | o | | | | | |
| R | | o | | o | o | | | | 2.181 |
| N | | | | o | | | | | |
| D first speed | o | | | o | | | | o | 2.458 |
| second speed | o | | (o) | o | | o | | | 1.458 |
| third speed | o | o | (o) | o | | | | | 1.000 |
| overdrive | o | o | (o) | | | | o | | 0.685 |
| 2nd | | o | | | o | o | | | 1.458 |
| 1st first speed | o | | | o | o | | | | 2.458 |
| second speed | o | | | o | | o | | | 1.458 |

Figure 2:
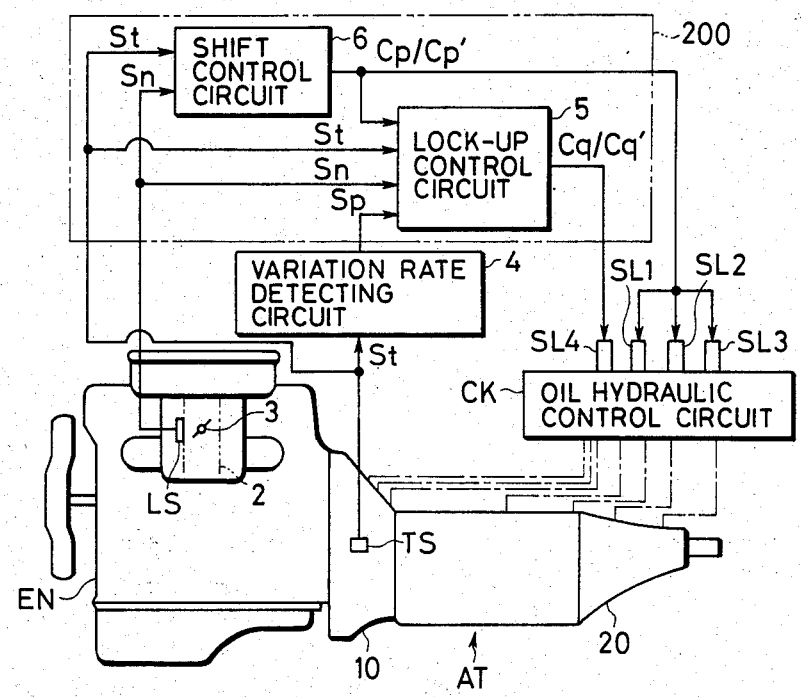
FIG. 2 is a schematic illustration showing one embodiment of lock-up control system for an automatic transmission according to the present invention, together with the automatic transmission to which the embodiment is applied and an engine.

FIG. 2 shows an embodiment of lock-up control system for an automatic transmission according to the present invention in conjunction with an engine EN employing the automatic transmission AT which is accompanied with the oil hydraulic control circuit CK as shown in FIG. 1. This embodiment is operative to control the oil hydraulic control circuit CK to perform the transmitting gear ratio shifting control and the lock-up control.

In the embodiment shown in FIG. 2, a control unit 200 is provided. The control unit 200 includes a lock-up control circuit 5 for effecting the lock-up control for the automatic transmission AT, and a shift control circuit 6 for effecting the transmitting gear ratio shifting control. The speed of the output shaft 14 of the torque converter 10 in the automatic transmission AT, that is, the speed of the turbine runner 12 (hereinafter, referred to as a turbine speed Tsp) is detected by a turbine speed sensor TS associated to the automatic transmission AT and the opening degree of a throttle valve 3 provided in an intake passage 2 of the engine EN (hereinafter, referred to as a throttle opening degree TH) is detected by an engine load sensor LS.

A turbine speed signal St obtained from the turbine speed sensor TS is supplied to a variation rate detecting circuit 4, the lock-up control circuit 5 and the shift control circuit 6, and a throttle opening degree signal Sn obtained from the engine load sensor LS is supplied to the lock-up control circuit 5 and the shift control circuit 6. It is to be noted that the turbine speed Tsp is used as an information corresponding to a vehicle speed, and the throttle opening degree TH is similarly used as an information corresponding to an engine load.

The variation rate detecting circuit 4 detects the variation rate of the turbine speed Tsp on the basis of the turbine speed signal St, for the purpose of detecting a variation of a predetermined degree in the turbine speed Tsp, and supplies a turbine speed variation signal Sp to the lock-up control circuit 5 when a variation rate taking a negative value having an absolute value equal to or more than a predetermined value, for example, such a variation that the turbine speed Tsp decreases by 50 rpm or more for 25 milliseconds, is detected, in other words, a predetermined reductive variation in the turbine speed Tsp is detected.

Figure 3:
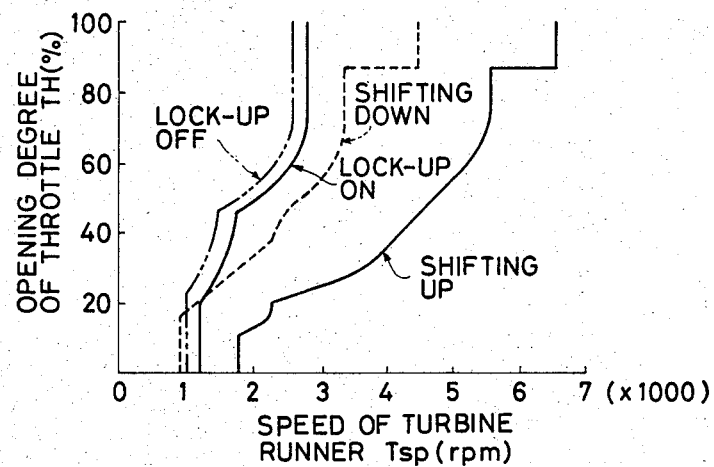
FIGS. 3, 4A and 4B are graphic diagrams used for explaining the operation of the embodiment shown in FIG. 2.

The shift control circuit 6 in the control unit 200 compares the turbine speed signal St from the turbine speed sensor TS, the throttle opening degree signal Sn from the engine load sensor LS, and an information represented by a travelling mode signal obtained from a mode sensor (not shown in FIGS.) for detecting a travelling mode of the vehicle, for example, with SHIFTING UP and SHIFTING DOWN lines on a gear ratio shifting map determined depending upon an engine load/turbine speed characteristic as shown in FIG. 3 to perform the operation to check whether the shift of gear ratio is to be effected or not. In accordance with the result of the check, a shifting up signal Cp or shifting down signal Cp' is supplied to the first, second and third solenoid valves SL1, SL2 and SL3 of the oil hydraulic control circuit CK, and these solenoid valves are selectively energized in the manner shown in Table 1 so as to conduct the controlling operation for the automatic transmission AT for changing the gear ratio to an upper stage of gear ratio (upshift) or lower stage of gear ratio (downshift). Further, the shifting up signal Cp or shifting down signal Cp' is supplied also to the lockup control circuit 5.

In addition, the lock-up control circuit 5 in the control unit 200 compares the turbine speed signal St from the turbine speed sensor TS, the throttle opening degree signal Sn from the engine load sensor LS and an information represented by the travelling mode signal, for example, with LOCK-UP ON and LOCK-UP OFF lines on the gear ratio shifting map shown in FIG. 3, so as to effect the operation to check whether the lock-up state is to be conducted or not, or whether the lock-up state is to released or not. In accordance with the result of the check, either a locking up signal Cq' or a lock-up releasing signal Cq' is supplied to the fourth solenoid valve SL4 of the oil hydraulic control circuit CK. In the case where the locking up signal Cq is supplied to the fourth solenoid valve SL4, the fourth solenoid SL4 is excited to cause the lock-up clutch 15 to operate. On the other hand, in the case where the lock-up releasing signal Cq' is supplied to the fourth solenoid valve SL4, the fourth solenoid valve SL4 is energized to disengage the lock-up clutch 15.

In such an embodiment of lock-up control system for an automatic transmission according to the present invention as described above, the transmitting gear ratio shifting control and the lock-up control in the automatic transmission AT are carried out on the basis of the shifting up signal Cp or the shifting down signal Cp' and the locking up signal Cq or the lock-up releasing signal Cq', respectively, and particularly, it is characterized that when the gear ratio of the automatic transmission AT is up-shifted with the lock-up clutch 15 being in operation, the disengagement of the lock-up clutch 15 is well timed as described below.

When an actual turbine speed Tsp' obtained from the turbine speed signal St supplied to the lock-up control circuit 5 from the turbine speed sensor TS relative to an actual throttle opening degree TH' obtained from the throttle opening degree signal Sn applied to the lock-up control circuit 5 from the engine load sensor LS exceeds, for example, the LOCK-UP ON line on the gear ratio shifting map aforementioned and shown in FIG. 3, the locking up signal Cq is supplied from the lock-up control circuit 5 to the fourth solenoid valve SL4 of the oil hydraulic control circuit CK and the fourth solenoid valve SL4 is excited to cause the lock-up clutch 15 to operate to hold a lock-up state.

In the condition wherein the lock-up state is held by the lock-up clutch 15, as soon as the turbine speed Tsp' relative to the throttle opening degree TH' at that time exceeds the SHIFTING UP line on the gear ratio shifting map shown in FIG. 3, the shifting up signal Cp is immediately produced in the shift control circuit 6 and supplied to the first, second and third solenoid valves SL1, SL2 and SL3 of the oil hydraulic control circuit CK.

Figure 4:
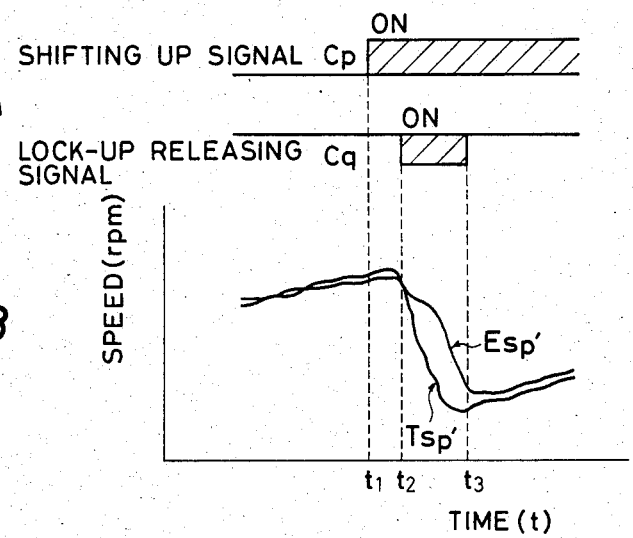

The variations in an engine speed Rsp and in the turbine speed Tsp in such a case are illustrated in a graph with an ordinate representing the speed (rpm) and the abscissa representing the time (t), as shown in FIG. 4B. Even at a time point $t_1$ at which the shifting up signal Cp is forwarded, as shown in FIG. 4A, each of the engine speed Esp and the turbine speed Tsp increases somewhat with a gentle gradient, and thereafter, decreases rapidly at a time point $t_2$. The reason for this is that, even if the shifting up signal Cp is supplied to the first, second and third solenoid valves SL1, SL2 and SL3 of the oil hydraulic control circuit CK at the time point $t_1$, the oil hydraulic control circuit CK has a certain lag in its operation and therefore causes a time lag from the time point $t_1$ to an instant at which the automatic transmission AT practically initiates its transmittion gear ratio shifting operation. Since the operation lag in the automatic transmission AT varies depending on an individual difference, the temperature of an oil and the amount of wear of friction elements or the like, it will be not uniform.

In this embodiment, accordingly, when the turbine speed Tsp' decreases steeply, that is, when the rate of variation in the speed of the output shaft of the torque converter 10 becomes a negative value having an absolute value more than a predetermined value after the time point $t_1$, such a variation rate is detected by the variation rate detecting circuit 4, for example, at the time point $t_2$ and the turbine speed variation signal Sp is supplied to the lock-up control circuit 5. Then, the lock-up releasing signal Cq' is supplied from the lock-up control circuit 5 to the fourth solenoid valve SL4 of the oil hydraulic control circuit CK to release the lock-up state held by the lock-up clutch 15.

As described above, in this embodiment, when the shifting up signal Cp is supplied in the situation wherein the lock-up clutch 15 is in the lock-up state, the lock-up releasing signal Cq' for disengaging the lock-up clutch 15 is delayed to be supplied to the oil hydraulic control circuit CK until the rate of variation in the turbine speed Tsp' amounts to the negative value having the absolute value more than the predetermined value. This causes the lock-up state to be released at a proper time point after the supply of the shifting up signal Cp, at which the speed of the output shaft 14 of the torque converter 10 is being appropriately reduced. Consequently, the shock is effectively suppressed and the spurt up of the engine is avoided during the shifting up operation. After the lapse of a predetermined period of time, that is, after the lock-up clutch 15 is brought and kept to be in its inoperative state until the shifting up operation in the automatic transmission AT is completed, the locking up signal Cq is supplied again from the lock-up control circuit 5 to the fourth solenoid valve SL4 of the oil hydraulic control circuit CK to effect the lock-up state held by the lock-up clutch 15. In such a case, the timing for effecting the lock-up operation can be set by detecting the fact that the turbine speed Tsp has varied to decrease appropriately in accordance with the shift or gear ratio.

The control unit 200 for effecting the control operation as described above is constituted with a microcomputer, for example, and the operating program of such microcomputer constituting the control unit 200 is carried out, for example, in accordance with flow charts shown in FIGS. 5, 6, 8, 10 and 12.

Figure 5:
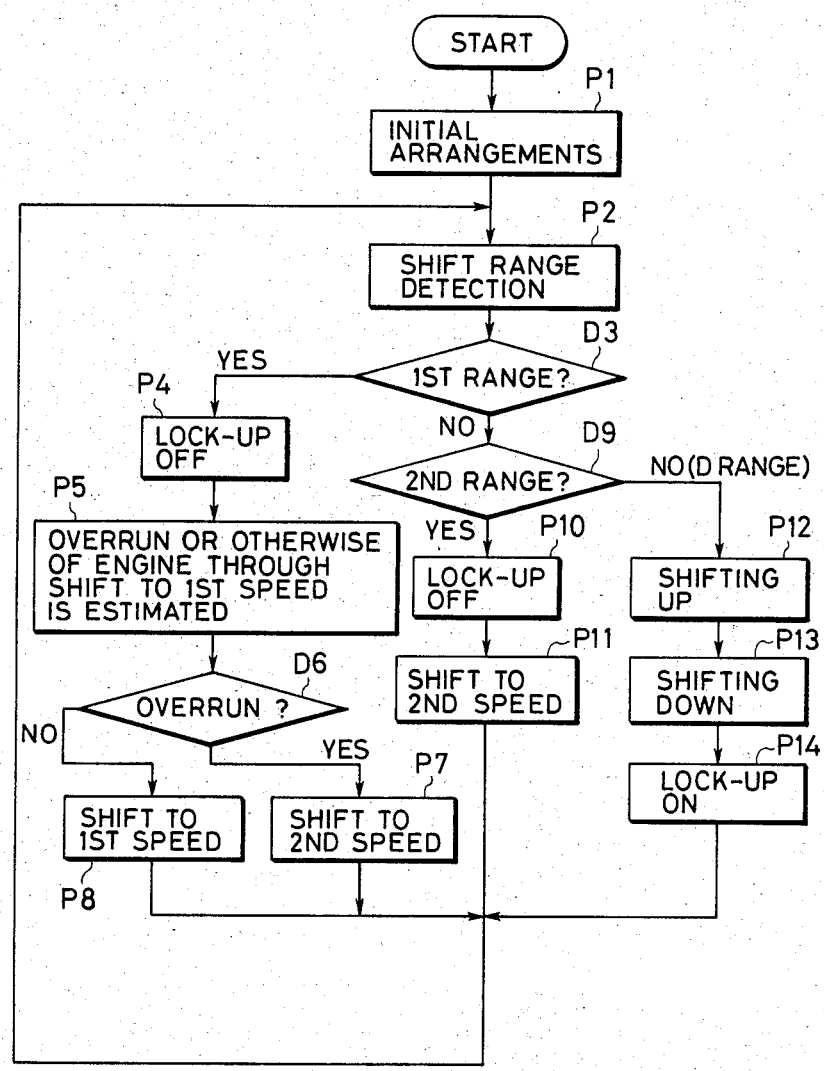
FIGS. 5, 6, 8, 10 and 12 are flow charts showing respectively examples of operational programs for a microcomputer used in a control unit employed in the embodiment shown in FIG. 2.

FIG. 5 shows the flow of the entire control operation by the control unit 200 which is commenced with initial arrangements at process P1. In the initial arrangements at the process P1, the ports of the respective control valves for switching over the oil hydraulic control circuit CK of the automatic transmission AT as well as required counters are initialized to set the multi-stage power transmitting gear arrangement 20 at the first gear ratio stage, namely, the first speed and the lock-up clutch 15 to be disengaged in its inoperative state. Then, the respective working areas in the control unit 200 are initialized.

Next, in process P2, the position of the selector valve 103, that is, a shift range is detected, and in decision D3, it is checked whether the detected shift range is the 1st range or not. When the detected shift range is the 1st range, the lock-up state is released at process P4, and the shifting down operation to the first speed is assumed to estimate the overrun or otherwise of the engine EN in process P5. If it is clarified that the engine EN is to overrun in decision D6, the step is advanced to process P7 in which the shift valves are controlled to carrying out the shift of gear ratio to the second speed, and then returned to the process P2. To the contrary, if it is clarified that the engine EN is not to overrun, the step is advanced to process P8 for the puropose of prevention of the shock due to the shift of gear ratio. In process P8, the shift of gear ratio is effected to the first speed, and the step is returned to the process P2.

On the other hand, if the detected shift range is not the 1st range as a result of the clarification in the decision D3, the step is advanced to decision D9 and it is checked whether the shift range is the 2nd range or not. If the shift range is the 2nd range, the lock-up state held by the lock-up clutch 15 is released in process P10. and then the shift of gear ratio is effected to the second speed in process P11. After that, the step is returned to the process P2. To the contrary, if the shift range is not the 2nd range, and therefore, is D range, the shifting up operation in process P12, the shifting down operation in process P13 and the locking up operation in process P14 are carried out in order, and then the step is returned to the process P2.

The shifting up operation carried out in the process P12 will be now described in detail with reference to FIG. 6.

Figure 7:
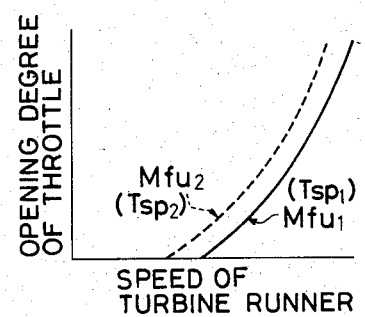
FIGS. 7, 9 and 11 are graphic diagrams used for explaining the operation of the control unit employed in the embodiment shown in FIG. 2 in accordance with the flow charts shown in FIGS. 5, 6, 8, 10 and 12.

This shifting up operation is commenced with detecting the shift position. Then, it is checked whether the detected shift position is the fourth gear ratio stage, that is, the fourth speed or not, in decision D21. When the shifting position is not the fourth speed, the actual throttle opening degree TH' is detected in process P22 and the turbine speed $Tsp_1$ on a predetermined map (hereinafter, referred to as a map turbine speed $Tsp_1$), for example, on a shifting line $Mfu_1$ in the gear ratio shifting map shown in FIG. 7 corresponding to the detected actual throttle opening degree TH' is detected in process P23. Next, in process P24, the actual speed of the output shaft 14 of the torque converter 10, that is, the actual turbine speed Tsp' is detected. In decision D25, the detected actual turbine speed Tsp' is compared with the map turbine speed $Tsp_1$ detected in the process P23, it is checked whether the actual turbine speed Tsp' is greater than the map turbine speed $Tsp_1$ or not.

If the actual turbine speed Tsp' is greater than the map turbine speed $Tsp_1$ as a result of the check in the decision D25, a flag 1 for shifting up by one stage is detected and judged if it is of 0 or 1, that is, it is in the reset state or set state in decision D26. The flag 1 is changed from 0 to 1 when the shifting up by one stage is carried out. When the flag 1 is in the reset state at the decision D26, it is brought to be of 1 in process P27. Then, the shifting up operation for one stage is carried out in process P28 to complete the one stage up-shifting operation. On the other hand, when the flag 1 is of 1, that is, in the set state at the decision D26, the step is brought to the end without taking another process.

Similarly, when the detected shift range is the fourth speed at the decision D21, the operation is brought to the end without taking another process.

Further, in the case where it is clarified that the actual turbine speed Tsp' is not greater than the map turbine speed Tsp' in the decision D25, a revised map turbine speed $Tsp_2$ is set in process P30. The revised map turbine $Tsp_2$ is obtained by multiplying the map turbine speed $Tsp_1$ by, for example, 0.8 and to be on a shifting line $Mfu_2$ shown by a dotted line in the gear ratio shifting map of FIG. 7. Subsequently, in decision D31, it is checked whether the actual turbine speed Tsp' is greater than the revised turbine speed $Tsp_2$ or not. When the actual turbine speed Tsp' is not greater than the revised turbine speed $Tsp_2$, the flag 1 is reset in process P32 to be ready for the next cycle, and on the contrary, when the actual turbine speed Tsp' is greater than the revised turbine speed $Tsp_2$, the operation is brought to the end as it is and followed by the shifting down operation.

Figure 8:
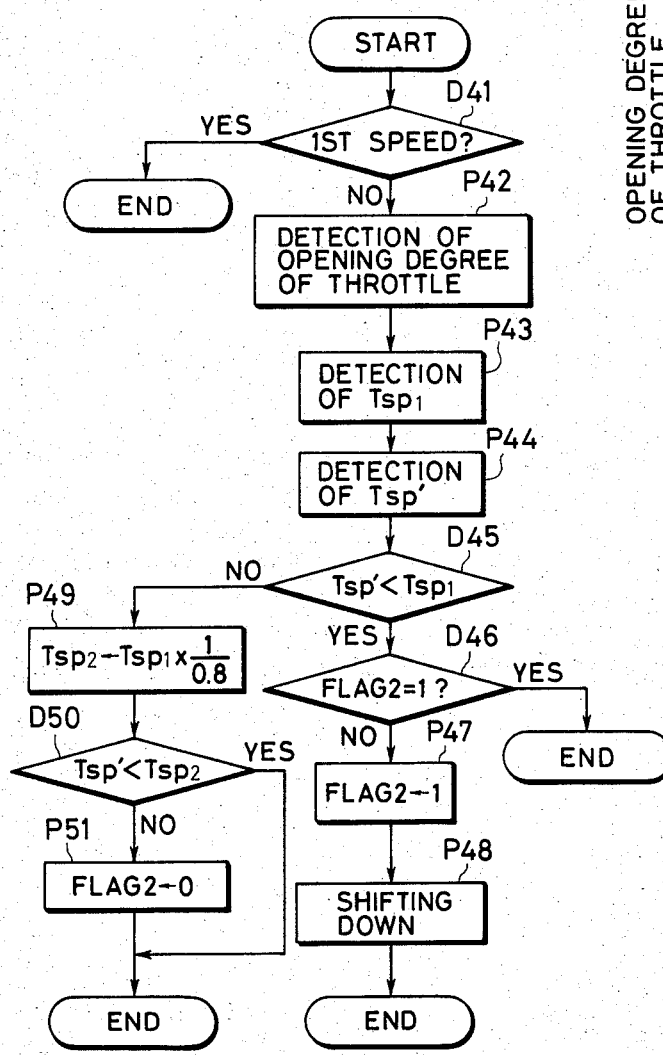
Figure 9:
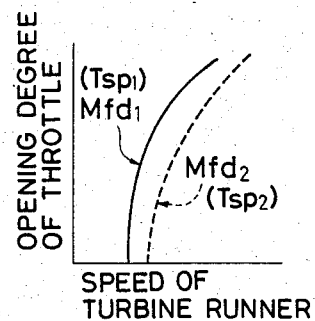

The shifting down operation is carried out in accordance with a shifting down controlling program shown in FIG. 8. In the shifting down operation, first the shift position is detected in the same manner as the shifting up operation. Then, in decision D41, it is checked whether the detected shift position is the first gear ratio stage, that is, the first speed or not. If the detected shift position is the first speed, the operation is brought to the end as it is. To the contrary, if it is not the first speed, the actual throttle opening degree TH' is detected in process P42 and the map turbine speed $Tsp_1$ on, for example, a shifting line $Mfd_1$ in the gear ratio shifting map shown in FIG. 9 corresponding to the detected actual throttle opening degree TH' is detected in process P43. Next, in process P44, the acutual turbine speed Tsp' is detected. Then, in decision D45, the detected actual turbine speed Tsp' is compared with the map turbine speed $Tsp_1$ detected in process P43, and it is checked whether the actual turbine speed Tsp' is smaller than the map turbine speed $Tsp_1$ or not.

If the actual turbine speed Tsp' is smaller than the map turbine speed $Tsp_1$ as a result of the check in the decision D45, a flag 2 for shifting down by one stage is detected and judged if it is of 0 or 1, that is, it is in the reset state or set state in decision D46. The flag 2 is changed from 0 to 1 when the shifting down by one stage has been effected. When the flag 2 is in the reset state at the decision D46, it is brought to be of 1 in process P47. Then, the shifting down operation is carried out in process P48. On the other hand, when the flag 2 is in the set state at the decision D46, the shifting down operation is impossible and therefore, the operation comes to the end as it is.

In the case where it is clarified that the actual turbine speed Tsp' is not smaller than the map turbine speed $Tsp_1$ in the decision D45, a revised map turbine speed $Tsp_2$ is set in process P49. The revised map turbine $Tsp_2$ is obtained by multiplying the map turbine speed $Tsp_1$ by, for example, 1/0.8 and to be on a shifting line $Mfd_2$ shown by a dotted line in the gear ratio shifting map of FIG. 9. Subsequently, in decision D50, it is checked whether the actual turbine speed Tsp' is smaller than the revised turbine speed $Tsp_2$ or not. When the actual turbine speed Tsp' is not smaller than the revised turbine speed $Tsp_2$, the flag 2 is reset in process P51 to be ready for the next cycle, and on the contrary, when the actual turbine speed Tsp' is smaller than the revised turbine speed $Tsp_2$, the operation is brought to the end as it is and followed by the lock-up operation.

In the shifting up or down operations described hereinbefore, the reason why the map turbine speed is revised by multiplied by 0.8 or 1/0.8 to form the revised map turbine speed thereby to produce a hysteresis when the transmitting gear ratio shifting operation is not effected, is that, when the engine speed and turbine speed are critical for the shifting up or down operation, a chattering can be suppressed even if the transmitting gear ratio shifting operation is carried out frequently.

Figure 10:
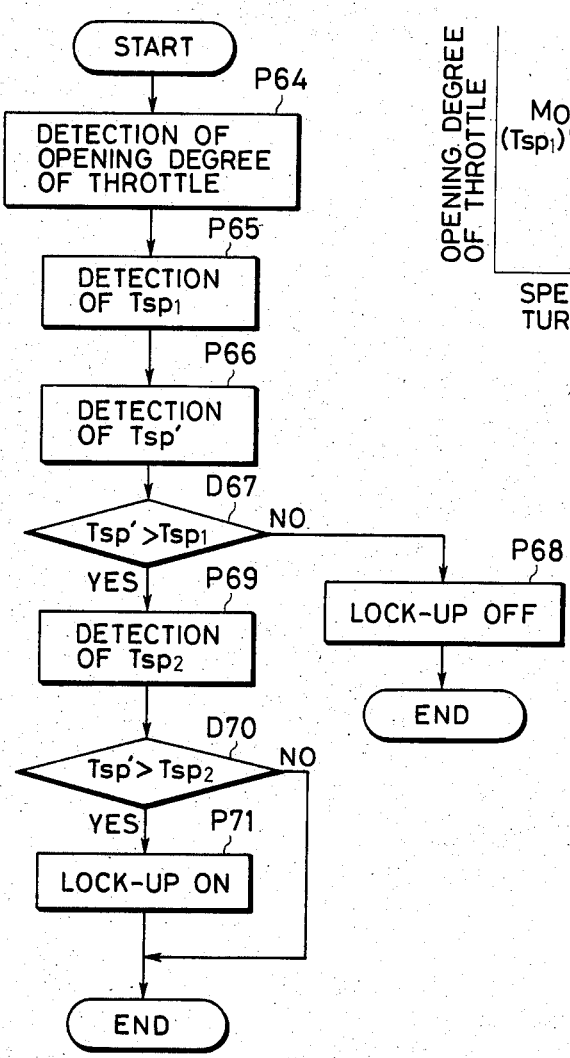

The lock-up operation will now be described with reference to FIG. 10.

The lock-up operation is commenced with detecting the actual throttle opening degree TH' in process P64. Then, the map turbine speed $Tsp_1$ on, for example, a shifting line $M_{OFF}$ provided for the lock-up releasing operation in the gear ratio shifting map shown in FIG. 11 corresponding to the detected actual throttle opening degree TH' is detected in process P65, and in process P66, the acutual turbine speed Tsp' is detected. Next, in decision D67, the detected acutual turbine speed Tsp' is compared with the map turbine speed Tsp$_1$, and it is checked whether the actual turbine speed Tsp' is greater than the map turbine speed Tsp$_I$ or not.

If the actual turbine speed Tsp' is not greater than the map turbine speed Tsp$_1$ as a result of the check in the decision D45, the lock-up state held by the lock-up clutch 15 is released in process P68 and the operation is brought into the end.

Figure 11:
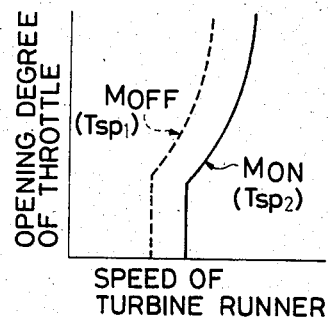

In the case where it is clarified that the actual turbine speed Tsp' is greater than the map turbine speed Tsp$_1$ in the decision D67, the map turbine speed Tsp$_2$ on, for example, a shifting line $M_{ON}$ provided for the locking up operation in the gear ratio shifting map shown in FIG. 11 corresponding to the detected actual throttle opening degree TH' is detected in process P69. Then, in decision D70, the acutual turbine speed Tsp' detected in the process P66 is compared with the map turbine speed Tsp$_2$, and it is checked whether the actual turbine speed Tsp' is greater than the map turbine speed Tsp$_2$ or not.

If the actural turbine speed Tsp' is greater than the map turbine speed Tsp$_2$ as a result of the check in the decision D70, the lock-up clutch 15 is caused to hold the lock-up state in process P71 and the operation is completed.

If the actural turbine speed Tsp' is not greater than the map turbine speed Tsp$_1$ as a result of the check in the decision D70, the operation is brought into the end as it is.

In the lock-up operation mentioned above, if the shifting up signal Cp is transmitted from the shift control circuit 6 under the situation in which the lock-up state is held by the lock-up clutch 15, the lock-up releasing signal Cq' is delayed in relation to shifting up signal Cp to be supplied from the lock-up control circuit 5 until the turbine speed Tsp has a predetermined reductive variation.

Figure 12:
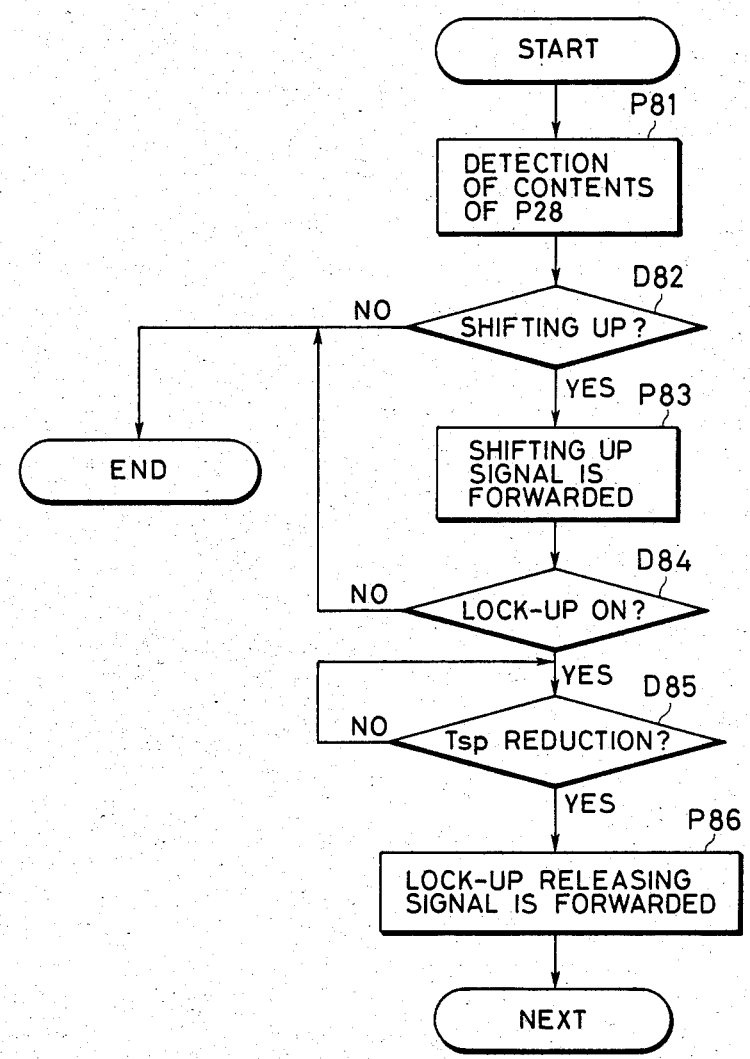

In such lock-up operation, a time point at which the lock-up releasing signal Cq' is supplied, that is, a time point at which the lock-up state is held by the lock-up clutch 15 is temporarily released is determined in accordance with a flow chart as shown in FIG. 12. In this flow, in process P81, the contents of the process P28 in the flow chart for the shifting up operation shown in FIG. 6 are detected. Then, in decision D82, it is checked whether the shifting up operation is to be carried out in the process P28 or not, based on the detected contents.

Figure 6:
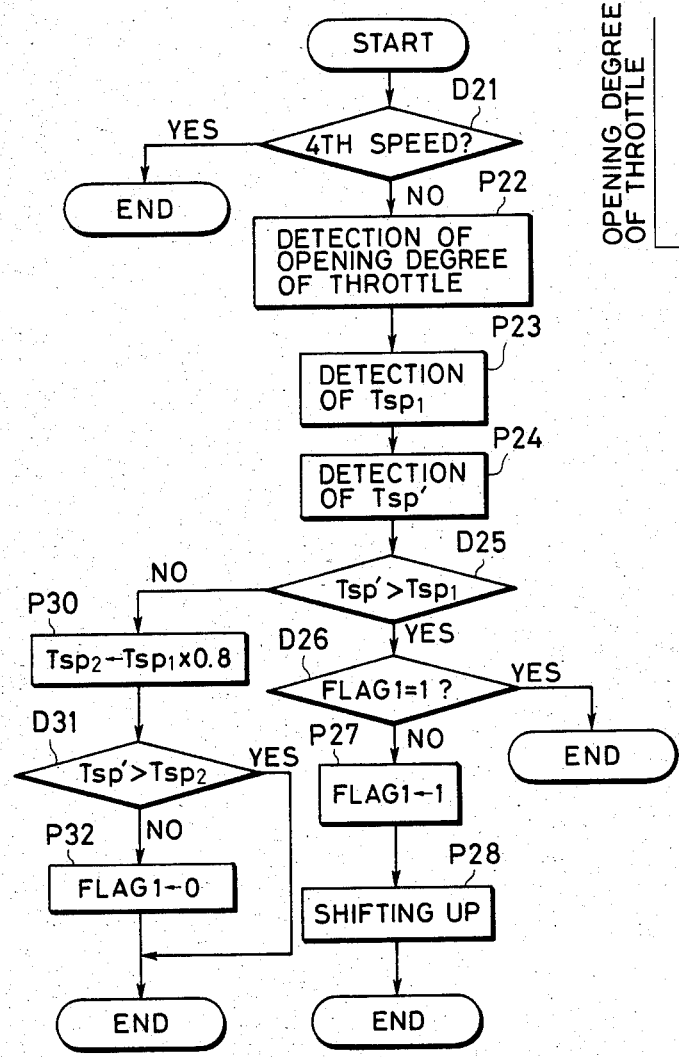

If it is clarified that the shifting up operation is not to be peformed in the process P28 in the flow chart shown in FIG. 6, the operation is terminated.

On the other hand, if it is clarified that the shifting up operation is to be performed in the process P28, the step is advanced to process P83, and in the process P83, the shifting up signal Cp is forwarded to the first, second and third solenoid valves SL$_1$, SL$_2$ and SL$_3$ of the oil hydraulic control circuit CK.

Next, in decision D84, it is checked whether the lock-up state is actually held or not. When it is clarified that the lock-up state is not actually held, the operation is terminated, and if it is clarified that the lock-up state is actually held, the step is advanced to decision D85. In the decision D85, it is checked whether the turbine speed variation signal Sp is obtained from the variation rate detecting circuit 4 or not, that is, the variation rate of the turbine speed Tsp becomes the negative value having the absolute value equal to or more than the predetermined value or not. In further other words, it is checked that the turbine speed Tsp has been steeply decreased so as to be lowered by, for example, 50 rpm for 25 milliseconds, or not. In the decision D85, the check is repeatedly conducted until the turbine speed Tsp is steeply decreased. Then, when it is clarified that the turbine speed variation signal Sp is obtained from the variation rate detecting circuit 4, the step is advanced to process P86 in which the lock-up releasing signal Cq' is supplied to the fourth solenoid valve SL$_4$ of the oil hydraulic control circuit CK so that the lock-up state held by the lock-up clutch 15 is released, and after that the operation is completed.

What is claimed is:

1. A lock-up control system for an automatic transmission including a torque converter coupled with the output portion on an engine, a power transmitting gear arrangement coupled with the output portion of the torque converter and controlled to vary the transmitting gear ratio therein by gear ratio control means in accordance with a shifting up or down command supplied to the latter, and a lock-up clutch provided for locking up the output portion of the torque converter to the output portion of the engine, the lock-up control system comprising:

lock-up operation control means for controlling said lock-up clutch to be in its operative state and in its inoperative state selectively, and for causing said lock-up clutch to be in the inoperative state thereof when said gear ratio control means performs the control with the shifting up or down command, and lock-up command means for preventing said lock-up operation control means from causing said lock-up clutch to be in the inoperative state thereof until a predetermined reductive variation in the speed of the output portion of said torque converter arises after the shifting up command is supplied to said gear ratio control means under the condition in which said lock-up clutch is in operation to hold a lock-up state.

2. A lock-up control system according to claim 1, wherein said lock-up command means comprises command producing means for generating an electric command and supplying the same to said lock-up operation control means, so that said lock-up clutch is controlled by said lock-up operation control means in accordance with the electric command from said lock-up command means.

3. A lock-up control system according to claim 2, wherein said command producing means comprises detecting circuit means for detecting the said predetermined reductive variation in the speed of the output portion of said torque converter, and control signal generating circuit means for generating a control signal supplied to said lock-up operation control means, said control signal generating circuit means being supplied with the output signal of said detecting circuit means so as to have a properly timed supply of the control signal for causing said lock-up clutch to be in the inoperative state thereof.

4. A lock-up control system according to claim 3, wherein said control signal generating circuit means comprises first means for supplying a locking up signal component of said control signal for causing said lockup clutch to be in the operative state thereof and second means for supplying a lock-up releasing signal component of said control signal for causing said lock-up clutch to be in the inoperative state thereof, and said second means being operative to delay the supply of said lock-up releasing signal component to said lock-up operation control means, in response to the output signal of said detecting circuit means, until said predetermined reductive variation in the speed of the output portion of said torque converter is detected by said detecting circuit means after the shifting up control signal is supplied to said gear ratio control means under the condition in which said lock-up clutch is in operation to hold the lock-up state.

5. A lock-up control system according to claim 2, wherein said lock-up operation control means comprises hydraulic control means for controlling hydraulically movement of said lock-up clutch and electromagnetic control means for actuating said hydraulic control means in accordance with the electric command supplied from said lock-up command means.

6. A lock-up control system for an automatic transmission including a torque converter coupled with the output portion on an engine, a power transmitting gear arrangement coupled with the output portion of the torque converter and controlled to vary the transmitting gear ratio therein by gear ratio control means in accordance with a shifting up or down control signal supplied to the latter, and a lock-up clutch provided for locking up the output portion of the torque converter to the output portion of the engine, the lock-up control system comprising:

hydraulic control means for controlling hydraulically movement of said lock-up clutch, electromagnetic control means for actuating said hydraulic control means, first sensing means for detecting an engine load, second sensing means for detecting the speed of the output portion of said torque converter variation detecting means for detecting a predetermined reductive variation in the speed of the output portion of said torque converter, and control signal supplying means for generating a locking up signal for causing said lock-up clutch to be in its operative state and a lock-up releasing signal for causing said lock-up clutch to be in its inoperative state in response to the output signals of said first and second sensing means and supplying said locking up and lock-up releasing signals to said electromagnetic control means, said control signal supplying means being operative to delay the supply of said lock-up releasing signal to said electromagnetic control means, in response to the output signal of said variation detecting means, until said predetermined reductive variation in the speed of the output portion of said torque converter is detected by said variation detecting means after the shifting up control signal is supplied to said gear ratio control means under the condition in which said lock-up clutch is in operation to hold a lock-up state.

7. A lock-up control system for an automatic transmission including a torque converter coupled with the output portion on an engine, a power transmitting gear arrangement coupled with the output portion of the torque converter and controlled to vary the transmitting gear ratio therein by gear ratio control means in accordance with a shifting up or down control signal supplied to the latter, and a lock-up clutch provided for locking up the output portion of the torque converter to the output portion of the engine the lock-up control system comprising:

hydraulic control means for controlling hydraulically movement of said lock-up clutch, electromagnetic control means for actuating said hydraulic control means, engine load sensing means for producing a first signal corresponding to an engine load, turbine speed sensing means for producing a second signal corresponding to the speed of the output portion on said torque converter, variation detecting means for processing said second signal obtained from said turbine speed sensing means to detect a predetermined reductive variation in the speed of the output portion of said torque converter, and control signal supplying means for generating a locking up signal and lock-up releasing signal on a strength of said first signal obtained from said engine load sensing means, said second signal and preset data of a lock-up characteristic provided to be compared with said first and second signals and supplying said locking up and lock-up releasing signals selectively to said electromagnetic control means, said control signal supplying means being operative to delay the supply of said lock-up releasing signal to said electromagnetic control means in response to the output signal of said variation detecting means, until said predetermined reductive variation in the speed of the output portion of said torque converter is detected by said variation detecting means after the shifting up control signal is supplied to said gear ratio control means under the condition in which said lock-up clutch is in operation to hold a lock-up state.

* * * * *